United States Patent
Kunimatsu

(10) Patent No.: US 8,261,041 B2
(45) Date of Patent: Sep. 4, 2012

(54) MEMORY MANAGEMENT DEVICE FOR ACCESSING CACHE MEMORY OR MAIN MEMORY

(75) Inventor: Atsushi Kunimatsu, Chiba (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 691 days.

(21) Appl. No.: 12/056,501

(22) Filed: Mar. 27, 2008

(65) Prior Publication Data
US 2008/0244165 A1 Oct. 2, 2008

(30) Foreign Application Priority Data
Mar. 28, 2007 (JP) ................................. 2007-084272

(51) Int. Cl.
*G06F 12/00* (2006.01)
(52) U.S. Cl. ......... 711/203; 711/103; 711/118; 711/206
(58) Field of Classification Search .................. 711/103, 711/118, 203, 206, E12.017, E12.008
See application file for complete search history.

(56) References Cited

U.S. PATENT DOCUMENTS

| | | | |
|---|---|---|---|
| 6,000,006 A | 12/1999 | Bruce et al. | |
| 6,456,517 B2 | 9/2002 | Kim | |
| 7,512,767 B2 * | 3/2009 | Ritzau ........................... | 711/170 |
| 7,716,411 B2 | 5/2010 | Panabaker et al. | |
| 7,870,446 B2 | 1/2011 | Kurashige | |
| 7,948,798 B1 | 5/2011 | Sheredy et al. | |
| 2007/0118688 A1 | 5/2007 | Lee et al. | |
| 2007/0204128 A1 | 8/2007 | Lee et al. | |
| 2007/0276988 A1 | 11/2007 | Luo et al. | |
| 2008/0140918 A1 | 6/2008 | Sutardja | |
| 2008/0147998 A1 | 6/2008 | Jeong | |
| 2008/0189452 A1 | 8/2008 | Merry et al. | |
| 2009/0055576 A1 | 2/2009 | Nakanishi et al. | |
| 2009/0150588 A1 | 6/2009 | Wang et al. | |
| 2011/0029723 A1 | 2/2011 | Lee et al. | |
| 2011/0246701 A1 | 10/2011 | Kano et al. | |

FOREIGN PATENT DOCUMENTS

| | | |
|---|---|---|
| JP | 07-146820 | 6/1995 |
| JP | 2001-266580 | 9/2001 |
| JP | 2002-073409 | 3/2002 |
| JP | 2005-235182 | 9/2005 |

OTHER PUBLICATIONS

Office Action for U.S. Appl. No. 12/236,880, mailed Jun. 14, 2011, 8 pgs.
Office Action for Japanese Patent Application No. 2007-084272, dated Dec. 21, 2011, mailed Jan. 10, 2012, Japanese Patent Office, 5 pgs. (with English translation).
Notice of Allowance for U.S. Appl. No. 12/236,880, mailed Nov. 1, 2011, 12 pgs.
Corrected Notice of Allowability for U.S. Appl. No. 12/236,880, mailed, Dec. 9, 2011, 5 pgs.

* cited by examiner

*Primary Examiner* — Jasmine Song
(74) *Attorney, Agent, or Firm* — Sprinkle IP Law Group

(57) ABSTRACT

An example of a device comprises a first MMU converting a logical address into a physical address for a cache, a controller accessing the cache based on the physical address for the cache, a first storage storing history data showing an access state to a main memory outside a processor, a second storage storing relation data showing a relationship between a logical address and a physical address in the main memory, and a second MMU converting a logical address into a physical address for the main memory based on the history and relation data and accessing the main memory based on the physical address for the main memory. The first and second MMU, controller, first storage, second storage are included in the processor.

19 Claims, 12 Drawing Sheets

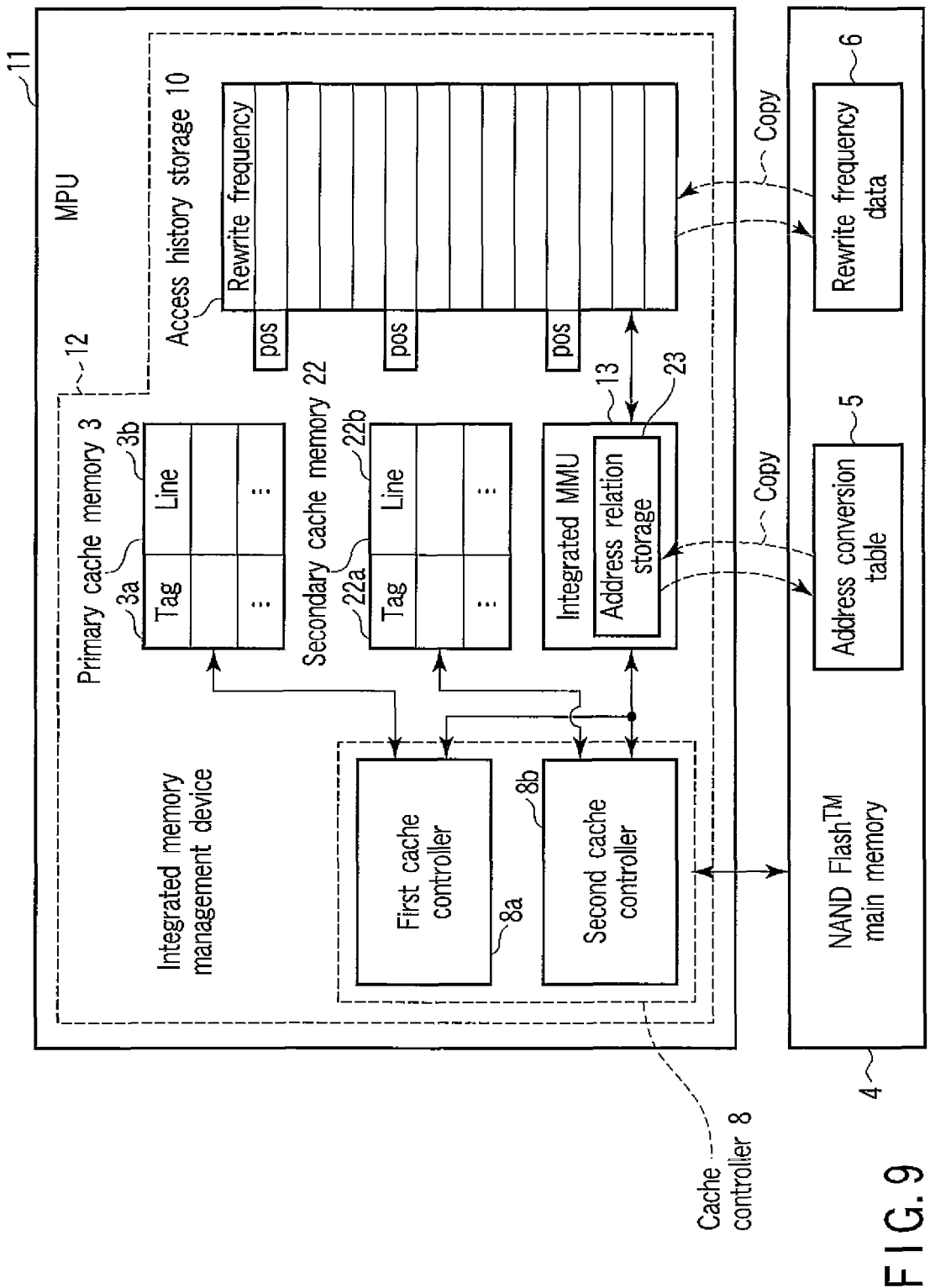
F I G. 9

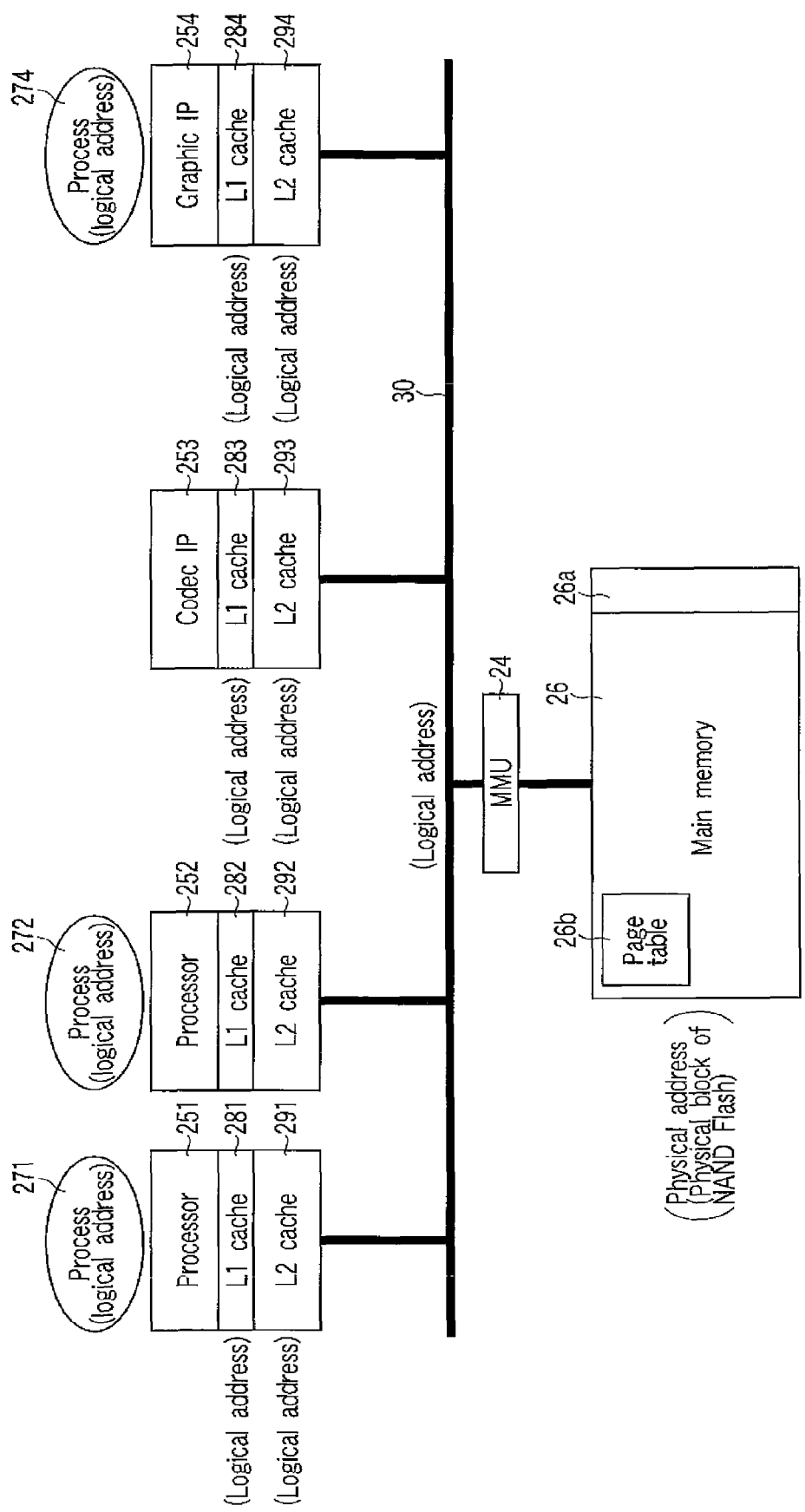
F I G. 11

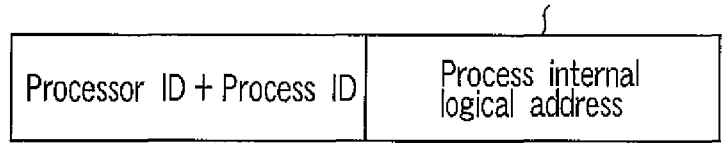
F I G. 12
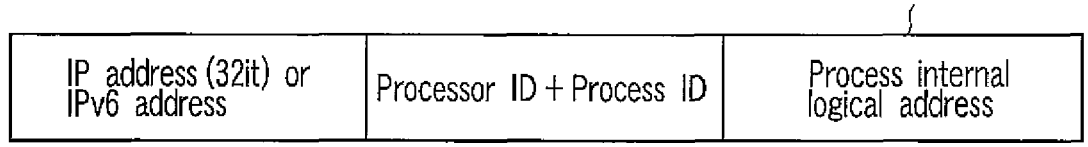
F I G. 14

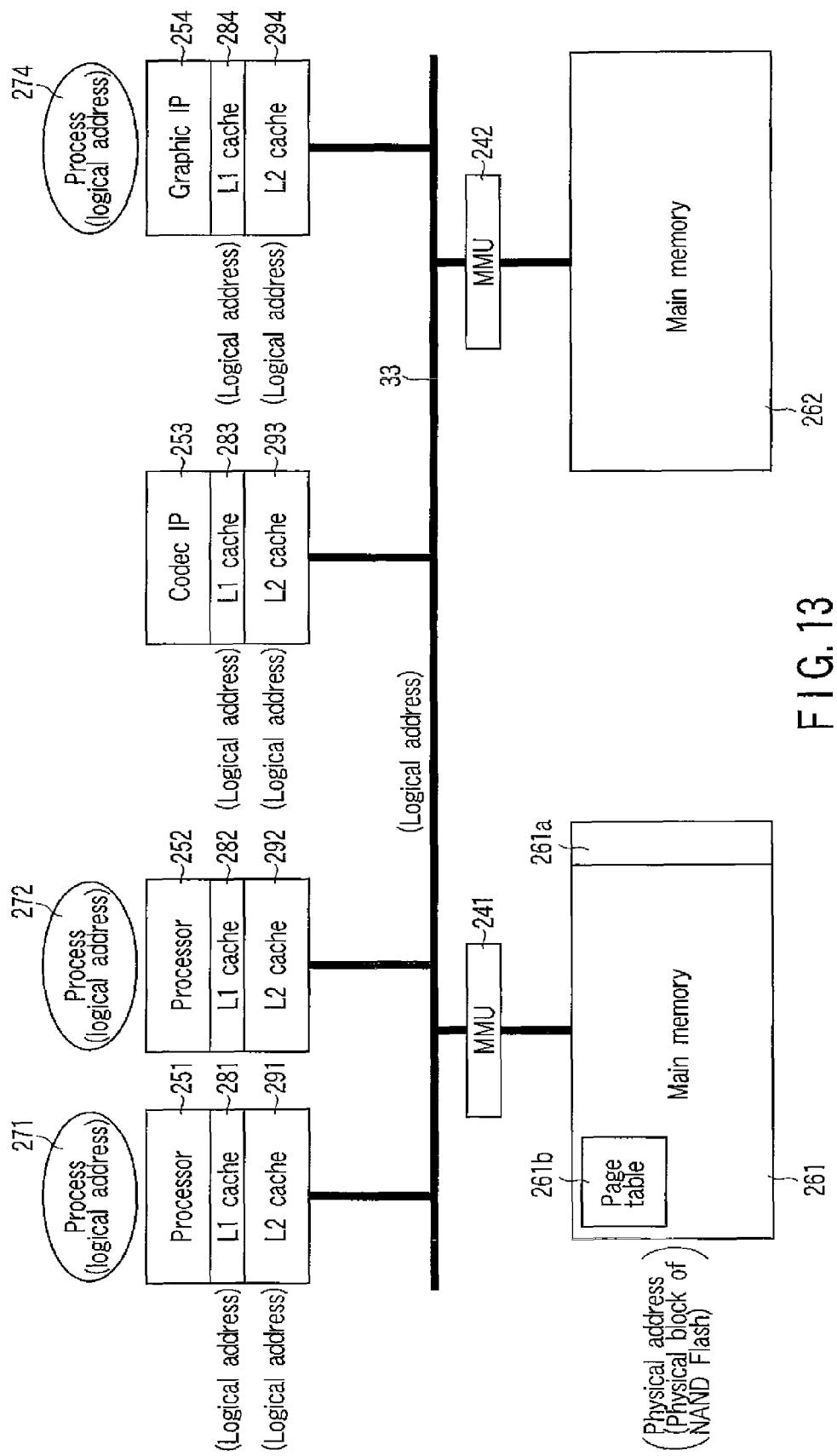
F I G. 13

MEMORY MANAGEMENT DEVICE FOR ACCESSING CACHE MEMORY OR MAIN MEMORY

CROSS-REFERENCE TO RELATED APPLICATIONS

This application is based upon and claims the benefit of priority from prior Japanese Patent Application No. 2007-084272, filed Mar. 28, 2007, the entire contents of which are incorporated herein by reference.

BACKGROUND OF THE INVENTION

1. Field of the Invention

The present invention relates to a device for managing writing or reading with respect to a cache memory and a main memory.

2. Description of the Related Art

Conventionally, a management function of a NAND Flash™ memory is built into a file system.

A micro processing unit (MPU) is provided with a cache memory. A dynamic random access memory (DRAM) is used as a main memory. When the MPU accesses the NAND Flash™ memory, an operation is carried out according to the following memory hierarchy in the conventional case.

First, the MPU converts a logical address to a physical address using a memory management unit (MMU) to make an access to a cache memory.

In this case, the MPU accesses the main memory, that is, DRAM, with respect to partial data by virtual memory management of an operating system (OS).

If the MPU further has a need to access the NAND Flash™ memory, the MPU makes the following controls to determine a physical location of the NAND Flash™ memory by a Flash File System. One is a control for avoiding a defective block in NAND Flash™ memory. Another is a control for making accesses to all blocks of the NAND Flash™ memory almost equally (without difference).

The MPU accesses the NAND Flash™ memory based on the determined physical location.

The conventional MPU must execute many operations included in different hierarchy when the number of memory hierarchy is much. For this reason, it is difficult to effect optimization between different hierarchy operations. For example, the MPU makes a changeover of data of the cache memory. In this case, it is difficult to realize control of managing bad block peculiar to the NAND Flash™ memory because the control belongs to different operation memory hierarchy.

A patent document 1 (Jpn. Pat. Appln. KOKAI Publication No. 2001-266580) discloses an invention enable different kind of a semiconductor memory device to be connected to a common bus.

The semiconductor memory device disclosed in the patent document 1 includes a random access memory chip and a package having the random access memory chip. The package has a plurality of pins electrically connecting the random access memory chip to an external device. The pins provide a memory function in common to the random access memory chip and an electrically erasable and programmable non-volatile semiconductor memory. The pins are arrayed according to the corresponding pin position of the non-volatile semiconductor memory.

BRIEF SUMMARY OF THE INVENTION

A memory management device according to an example of the invention comprises:

a first memory management unit converting a logical address for accessing a cache memory into a physical address for accessing the cache memory, and included in a processor;

a cache controller accessing the cache memory based on the physical address for accessing the cache memory, and included in the processor;

an access history storage storing access history data showing an access state to a main memory outside the processor, and included in the processor;

an address relation storage storing address relation data showing a relationship between a logical address and a physical address in the main memory, and included in the processor; and a second memory management unit converting a logical address for accessing the main memory into a physical address for accessing the main memory based on the access history data and the address relation data, and accessing the main memory based on the physical address for accessing the main memory, and further, included in the processor.

BRIEF DESCRIPTION OF THE SEVERAL VIEWS OF THE DRAWING

FIG. 9 is a block diagram showing a second example of an integrated memory management device in accordance with the third embodiment;

FIG. 11 is a block diagram showing the configuration of a memory device according to a fifth embodiment of the present invention;

FIG. 12 is a block diagram showing the configuration of a system logical address according to the fifth embodiment;

FIG. 13 is a block diagram showing the configuration of a memory device according to a sixth embodiment of the present invention;

FIG. 14 is a block diagram showing the configuration of a system logical address according to the sixth embodiment.

DETAILED DESCRIPTION OF THE INVENTION

Figure 1:
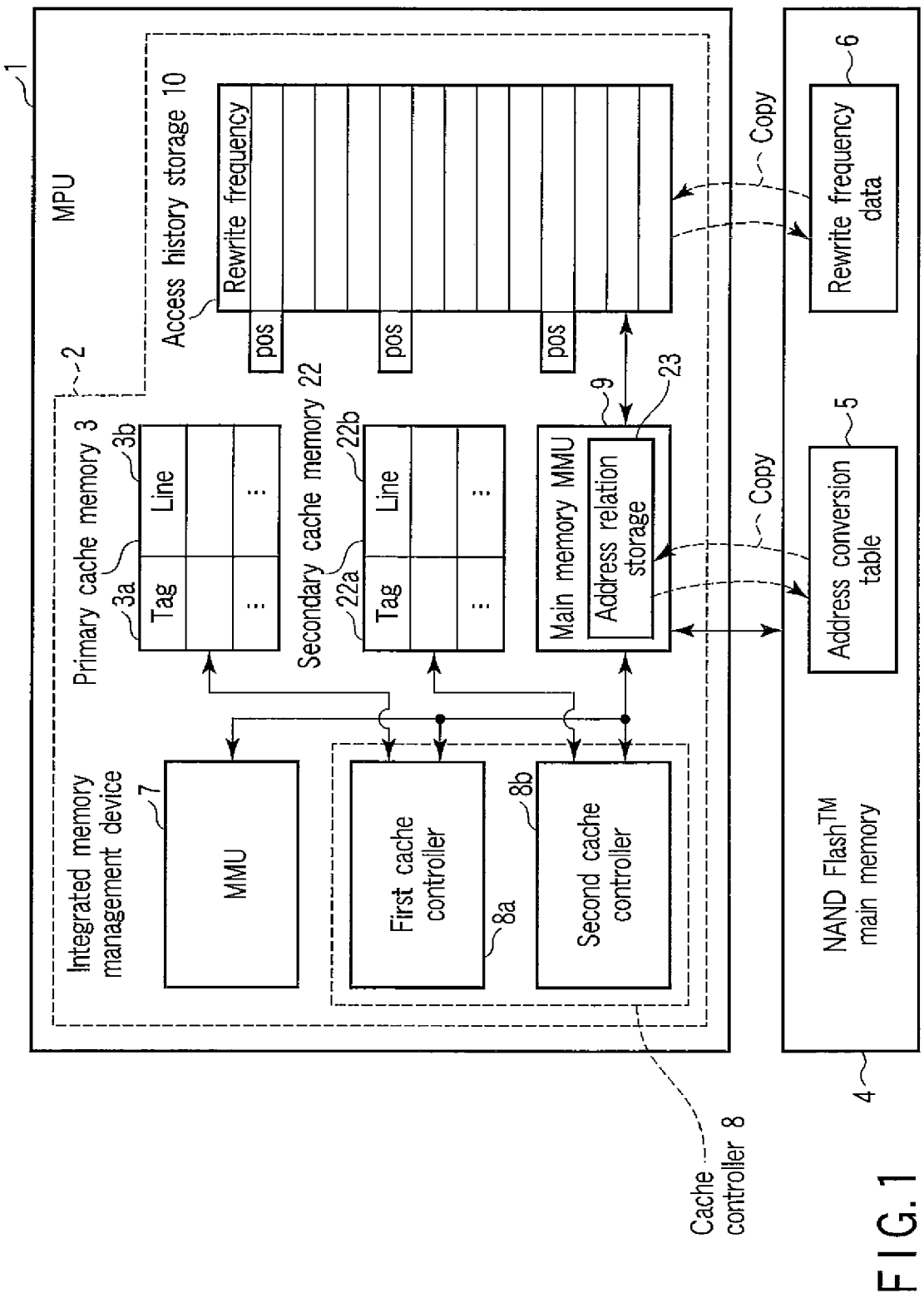
FIG. 1 is a block diagram showing an example of an integrated memory management device in accordance with the first embodiment of the present invention.

Various embodiments of the present invention will be hereinafter described with reference to the accompanying drawings. In the following description, the same reference numerals are used to designate the identical functions and components. The overlapping explanation will be made if necessary only.

(First Embodiment)

An integrated memory management device of this embodiment is included in a MPU. The integrated memory management device makes memory management with respect to a cache memory and a main memory. The integrated memory management device reduces the number of memory hierarchies related to memory access, and readily realizes optimization of memory access.

The first embodiment relates to the integrated memory management device, which are integrated with a MMU of MPU, a cache controller of MPU and a main memory MMU.

FIG. 1 is a block diagram showing an example of the integrated memory management device according to the first embodiment. This embodiment describes the case where a NAND Flash™ memory is used as the main memory. However, in this case, other memory may be used. According to this embodiment, the term, "access" includes at least one of read and write of data (or program).

A MPU 1 includes an integrated memory management device 2, and accesses a NAND Flash™ main memory 4.

The NAND Flash™ main memory 4 stores an address conversion table 5 and rewrite frequency data 6 inside. The rewrite frequency data 6 corresponds to main memory history data showing an accessed state of the main memory.

The address conversion table 5 is data associating a logical address with a physical location (or physical address) in the NAND Flash™ main memory 4.

The rewrite frequency data 6 shows the number of rewrite times of each block of the NAND Flash™ main memory 4.

The integrated memory management device 2 includes MMU 7, cache controller 8, primary cache memory 3, secondary cache memory 22, main memory MMU 9, and access history storage (NAND information registers) 10. The cache controller 8 includes a first cache controller 8a used for the primary cache memory 3 and a second cache controller 8b used for the secondary cache memory 22. The main memory MMU 9 includes address relation storage 23.

The first embodiment relates to the case where the cache memory is two. However, in this case, the number of cache memories may be one or three or more.

The MMU 7 converts a logical address of the cache memory 3 into a physical address.

The primary cache memory 3 has a tag storage area 3a and a line storage area 3b.

The secondary cache memory 22 has a tag storage area 22a and a line storage area 22b.

According to this embodiment, each line size of the primary and secondary cache memories 3 and 22 is set as follows. Specifically, the line size is set to the same size (e.g., 256 kilobytes) as the block of the NAND Flash™ main memory 4 or to a multiple of the block thereof. In this way, the following operations are carried out at a unit of block. One is an operation of moving data of the NAND Flash™ main memory 4 to the primary or secondary cache memory 3 or 22. Another is an operation of moving data of the primary or secondary cache memory 3 or 22 to the NAND Flash™ main memory 4. Thus, data move can be simplified.

In this embodiment, the primary and secondary cache memories 3 and 22 are a write back type. The secondary cache memory 22 has a storage capacity larger than the primary cache memory 3; however, the operation is low speed.

The first cache controller 8a controls access to the primary cache memory 3.

More specifically, when reading data from the primary cache memory 3, the first cache controller 8a reads data corresponding to a physical address of the primary cache memory 3 according to the physical address obtained from the MMU 7. When writing data to the primary cache memory 3, the first cache controller writes write target data to a location corresponding to the physical address of the primary cache memory 3 according to the physical address obtained from the MMU 7.

The second cache controller 8b controls access to the secondary cache memory 22.

More specifically, when reading data from the secondary cache memory 22, the second cache controller 8b reads data corresponding to a physical address of the secondary cache memory 22 according to the physical address obtained from the MMU 7. When writing data to the secondary cache memory 22, the second cache controller writes write target data to a location corresponding to the physical address of the secondary cache memory 22 according to the physical address obtained from the MMU 7.

The main memory MMU 9 controls access to the NAND Flash™ main memory 4.

The main memory MMU 9 stores part or all of the address conversion table 5 of the NAND Flash™ main memory 4 in the address relation storage 23 as address relation data if necessary. The main memory MMU 9 stores part or all of the rewrite frequency data 6 of the NAND Flash™ main memory 4 to the access history storage 10 as access history data if necessary.

The main memory MMU 9 converts the logical address of the NAND Flash™ main memory 4 to a physical location.

The main memory MMU 9 reads data from the NAND Flash™ main memory 4 based on the physical location of the NAND Flash™ main memory 4. Thereafter, the main memory MMU 9 stores the read data in the primary or secondary cache memory 3 or 22 using the first or second cache controller 8a or 8b.

When reading new data from the NAND Flash™ main memory 4, the main memory MMU 9 reads address conversion table data and rewrite frequency data related to the new data. Thereafter, the main memory MMU 9 stores the foregoing two data in the address relation storage 23 and the access history storage 10, respectively.

When writing data to the NAND Flash™ main memory 4, the main memory MMU 9 executes the following controls based on the foregoing address relation data and access history data. One is a control of accessing all blocks of the NAND Flash™ main memory 4 equally (regardless of the kind). Another is a control for equalizing the rewrite frequency of each block of the NAND Flash™ main memory 4.

Another is a control of avoiding a defective block. The main memory MMU 9 acquires data stored in the primary or secondary cache memory 3 or 22 using the first or second cache controller 8a or 8b. Then, the main memory MMU 9 stores the acquired data in the NAND Flash™ main memory 4 based on the physical location of the NAND Flash™ main memory 4.

When data is written in the NAND Flash™ main memory 4, the main memory MMU 9 updates the address relation data of the address relation storage 23 based on the relationship between a logical address and a physical location related to the written data. The main memory MMU 9 further updates the access history data of the access history storage 10.

The main memory MMU 9 reflects the following data to the address conversion table 5 and the rewrite frequency data 6 of the NAND Flash™ main memory 4. One is the address relation data stored in the main memory MMU 9 and another is the access history data stored in the access history storage 10. In other words, the main memory MMU 9 matches the address relation data stored in the MPU 1 with the address conversion table 5 stored in the NAND Flash™ main memory 4. The MMU 9 further matches the access history data of the access history storage 10 with the rewrite frequency data of the NAND Flash™ main memory 4.

The access history storage 10 stores an access state history of the block (physical location) of the NAND Flash™ main memory 4. According to this embodiment, the access history storage 10 stores rewrite frequency data of part or all blocks in the rewrite frequency data 6 of each block of the NAND Flash™ main memory 4.

For example, the rewrite frequency of each block is recorded using four bytes. Each block size is set to 256 kilobytes. In this case, if the storage capacity of the NAND Flash™ main memory 4 is 1 megabyte, the number of blocks stored in the NAND Flash™ main memory 4 is four. Thus, the storage capacity required for storing the rewrite frequency of each block is 16 bytes. In the same case as above, if the storage capacity of the NAND Flash™ main memory 4 is 1 gigabyte, the number of blocks stored in the NAND Flash™ main memory 4 is 4096. Thus, the storage capacity required for storing the rewrite frequency of each block is 16 kilobytes. Likewise, if the storage capacity of the NAND Flash™ main memory 4 is 16 gigabytes, the storage capacity required for storing the rewrite frequency of each block is 64 kilobytes.

For example, if the NAND Flash™ main memory 4 has a large capacity such as 128 gigabytes, the access history storage 10 stores part of the rewrite frequency data 6 in the NAND Flash™ main memory 4. As described above, a symbol "pos" is marked on the rewrite frequency because the access history storage 10 stores part of the rewrite frequency data 6. The "pos" is used the same manner as a cache tag.

Hereinafter, an operation of the main memory MMU 9 will be schematically described.

The main memory MMU 9 stores part of the address conversion table 5 of the NAND Flash™ main memory 4 in the address relation storage 23. The main memory MMU 9 further stores part of the rewrite frequency data 6 in the access history storage 10.

When the cache memories 3 and 22 does not store read target data, the main memory MMU 9 reads the data from there. Thereafter, the main memory MMU 9 stores data which corresponds to the read data and is included in the address conversion table 5 in the address relation storage 23. In addition, the main memory MMU 9 stores data which corresponds to the read data and is included in the rewrite frequency data 6 in the access history storage 10.

When writing data from the MPU 1 to the NAND Flash™ main memory 4, the main memory MMU 9 converts a logical address of the NAND Flash™ main memory 4 into a physical location. Then, the main memory MMU 9 writes write target data in cache lines 3b and 22b to the NAND Flash™ main memory 4. In addition, the main memory MMU 9 updates address relation data stored in the address relation storage 23 and access history data stored in the access history storage 10.

The main memory MMU 9 updates the address conversion table 5 and the rewrite frequency data 6 based on the address relation data of the address relation storage 23 and the access history data of the access history storage 10.

For example, if the primary cache memory 3 is read only, there is no write to the cache line 3b from the MPU 1. In this case, the main memory MMU 9 overwrites data read from the NAND Flash™ main memory 4 on the primary cache memory 3 using the first cache controller 8a. When read of the data stored in the primary cache memory 3 is generated, the first cache controller 8a reads data from the first cache memory 3.

Conversely, if the primary cache memory 3 is not read only, the MPU 1 executes a program to write the obtained data to the cache memory 3. When data is written from the MPU 1 to the cache line 3b, the data of the cache line 3b is written back to the NAND Flash™ main memory 4. In this case, the main memory MMU 9 reads the written-back data from the cache memory 3 via the first cache controller 8a. The main memory MMU 9 selects a block having rewrite frequency less than a predetermined number as a write back location of the NAND Flash™ main memory 4 based on the access history data of the access history storage 10. Thereafter, the main memory MMU 9 stores the written-back data in the selected block. Then, the main memory MMU 9 updates address relation data showing a conversion relationship between a logical address and a physical location in the NAND Flash™ main memory 4 with respect to the selected block. The main memory MMU 9 further updates the rewrite frequency of the access history storage 10 with respect to the selected block.

Thereafter, the main memory MMU 9 updates the address conversion table 5 and the rewrite frequency data 6 according to the contents of the address relation storage 23 and the access history storage 10.

Figure 2:
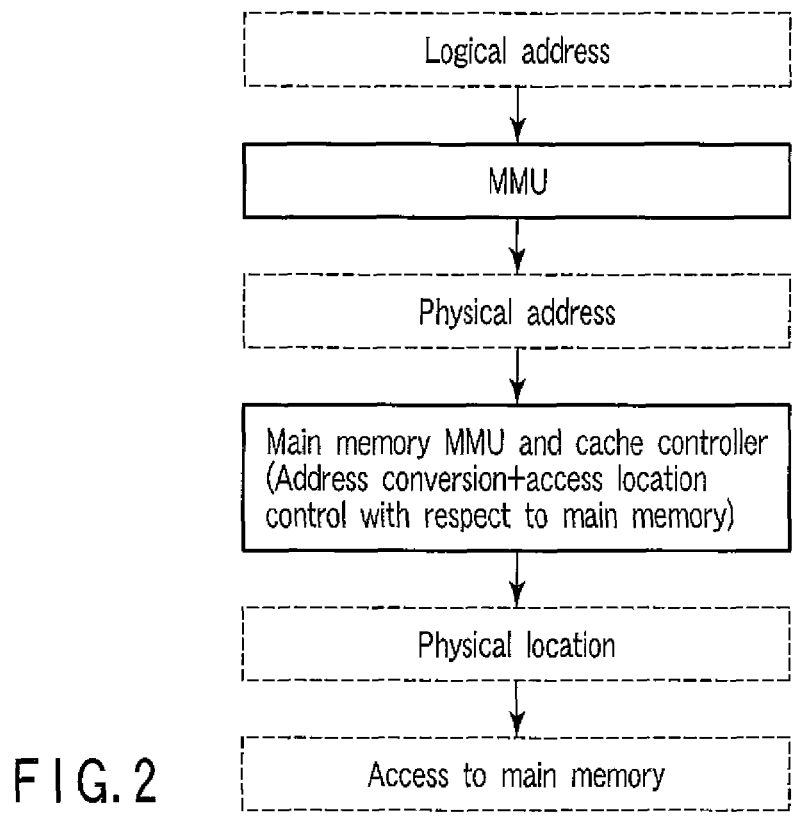
FIG. 2 is a view showing an example of a memory hierarchy of the integrated memory management device in accordance with the first embodiment.

FIG. 2 is a view showing one example of a memory hierarchy of the integrated memory management device 2 of this embodiment.

The memory hierarchy has a hierarchy belonging to the MMU 7, and a hierarchy belonging to the main memory MMU 9 and the cache controller 8.

In the hierarchy of the MMU 7, a logical address is converted into a physical address.

In the hierarchy belonging to the main memory MMU 9, for example, access destination, that is, the physical location of the NAND Flash™ main memory 4 is determined. In the hierarchy belonging to the main memory MMU 9, access control for a block having rewrite frequency less than a predetermined number (e.g., minimum) is carried out.

Then, the integrated memory management device 2 accesses the NAND Flash™ main memory 4 based on the determined physical location.

Figure 3:
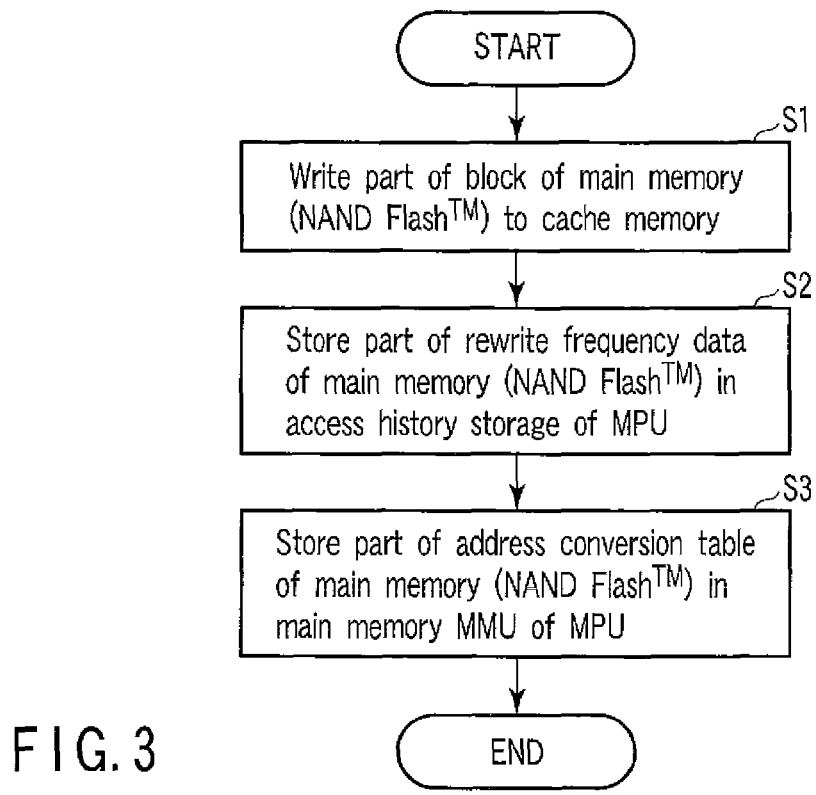
FIG. 3 is a flowchart to explain an example of an operation when a MPU including the integrated memory management device according to the first embodiment stores data of a NAND Flash™ memory, part of rewrite frequency data of a NAND Flash™ memory, and part of an address conversion table of a NAND Flash™ memory in the MPU.

FIG. 3 is a flowchart to explain an example of an operation when the MPU 1 including the integrated memory management device 2 stores data of the NAND Flash™ main memory 4, part of the rewrite frequency data 6 of the NAND Flash™ main memory 4, and part of the address conversion table 5 of the NAND Flash™ main memory 4 in the MPU 1.

In step S1, the main memory MMU 9 reads partial data (first, 1 gigabyte from the header) of the NAND Flash™ main memory 4 used by the MPU 1. The cache controller 8 writes the read data to cache lines 3b and 22b of the cache memories 3 and 22.

In step S2, the main memory MMU 9 copies part of the rewrite frequency data 6 stored in the NAND Flash™ main memory 4 into the access history storage 10 included in the MPU 1. (i.e., the part is rewrite frequency of the block with respect to data stored in cache memories 3 and 22. Incidentally, data equivalent to 1 gigabyte from the header may be first copied.)

In step S3, the main memory MMU 9 copies part of the address conversion table 5 stored in the NAND Flash™ main memory 4 into the address relation storage 23 of the main memory MMU 9 of the MPU 1. (i.e., the part is data showing the relationship between logical address and physical location of the block corresponding to data stored in cache memories 3 and 22. Incidentally, data equivalent to 1 gigabyte from the header may be first copied.)

The procedures of the foregoing steps S1 to S3 are taken in the free sequence, and may be executed in parallel.

Figure 4:
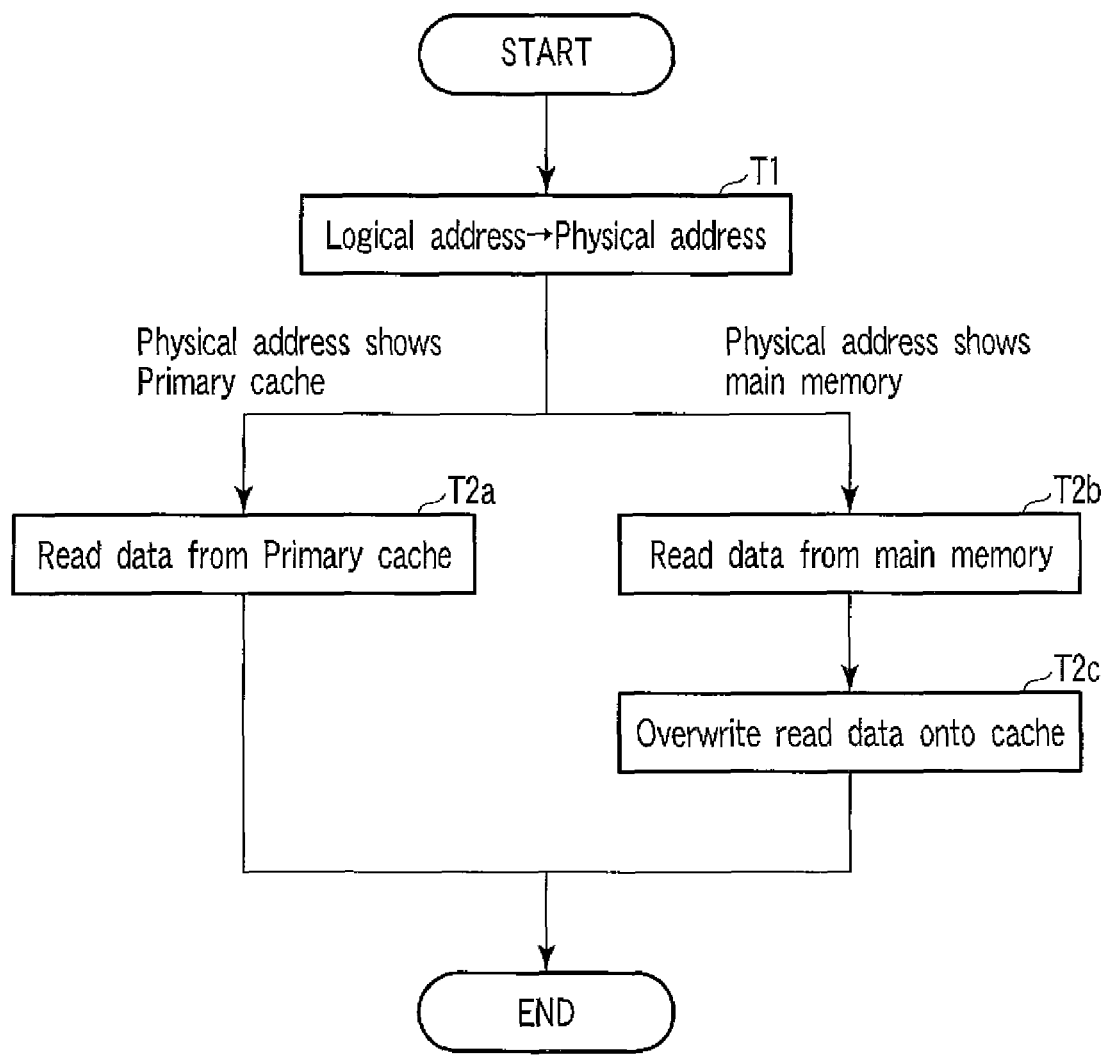
FIG. 4 is a flowchart to explain an example of an operation of reading data from a primary cache memory or NAND Flash™ main memory by a MPU including the integrated memory management device according to the first embodiment.

FIG. 4 is a flowchart to explain an example of an operation of reading data from the primary cache memory 3 or NAND Flash™ main memory 4 by the MPU 1 including the integrated memory management device 2. In this case, the case of reading data from the secondary cache memory 22 is the same as the case of the primary cache memory 3.

In step T1, the MMU 7 and the main memory MMU 9 converts a read target logical address to a physical address.

If the read target physical address indicates the primary cache memory 3, in step T2a, the first cache controller 8a reads the read target data from the primary cache memory 3 based on the physical address.

If the read target physical address (physical location) indicates the NAND Flash™ main memory 4, in step T2b, the main memory MMU 9 reads data corresponding to the physical address from the NAND Flash™ main memory 4.

In step T3b, the main memory MMU 9 overwrites the data read from the NAND Flash™ main memory 4 onto the primary cache memory 3 via the first cache controller 8a.

If Address relation data and access history data corresponding to data newly read from the NAND Flash™ main memory 4 are not stored in the address relation storage and the access history storage, the main memory MMU 9 stores data corresponding to the newly read data in the address relation storage and the access history storage based on the address conversion table 5 and the rewrite frequency data 6 of the NAND Flash™ main memory 4.

Figure 5:
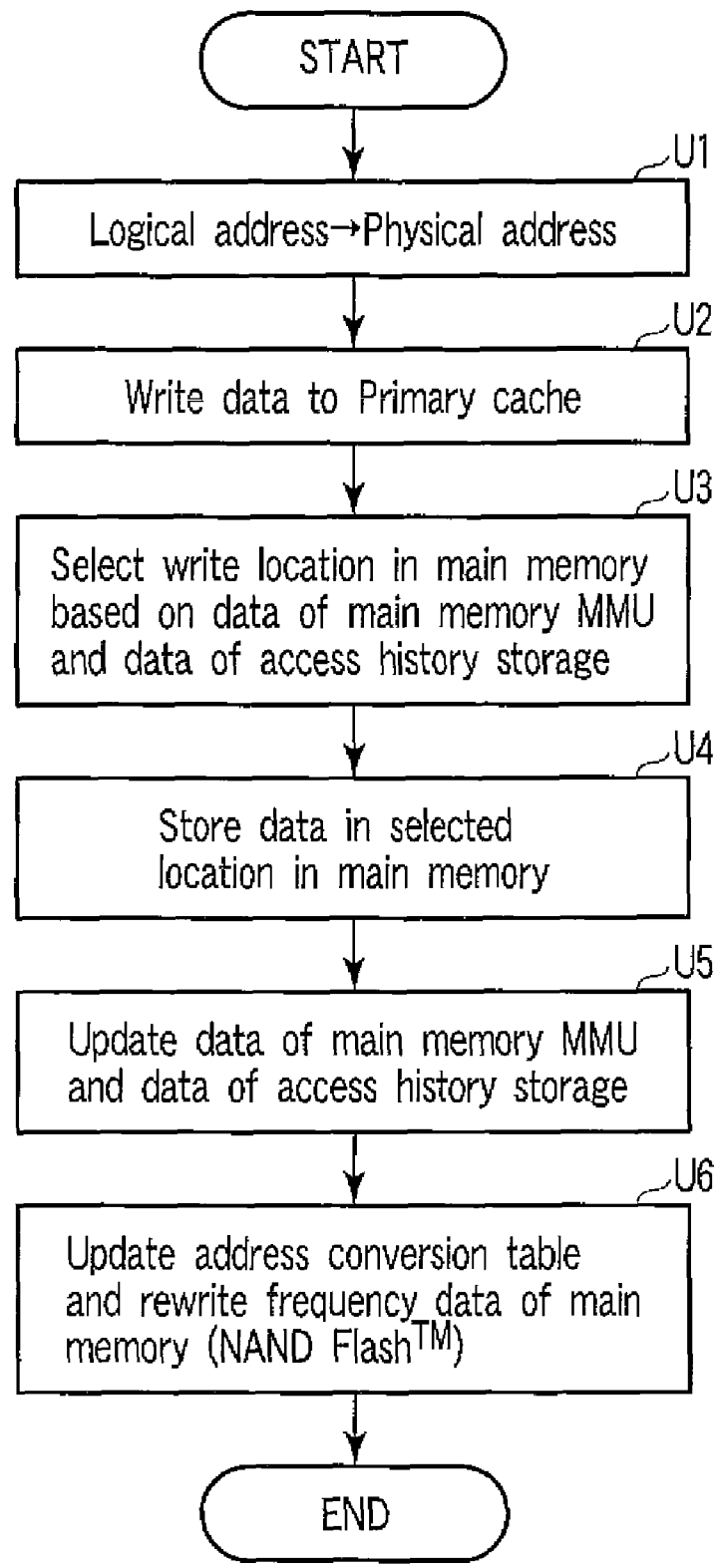
FIG. 5 is a flowchart to explain an example of an operation when overwrite to a cache line of the Primary cache memory occurs from the MPU including the integrated memory management device according to the first embodiment.

FIG. 5 is a flowchart to explain an example of an operation when overwrite to the cache line 3b of the primary cache memory 3 is generated from the MPU 1 including the integrated memory management device 2 of this embodiment. In this case, the case where overwrite to the secondary cache memory 22 is generated is the same as the case of the primary cache memory 3.

In step U1, the MMU 7 makes conversion from logical address to physical address.

In step U2, the first cache controller 8a stores write target data in the primary cache memory 3 in accordance with the physical address.

In step U3, the main memory MMU 9 selects a location of a block having rewrite frequency less than a predetermined value or a location of a block having the least rewrite frequency as a rewrite location of the NAND Flash™ main memory 4 based on the following data. One is address relation data of the address relation storage 23, and another is access history data of the access history storage 10.

In step U4, the main memory MMU 9 stores the write target data in the selected location of the NAND Flash™ main memory 4.

In step U5, the main memory MMU 9 updates the address relation data of the address relation storage 23 so that the data corresponds to the cache line 3b after overwritten. The main memory MMU 9 further updates the access history data of the access history storage 10.

In step U6, the main memory MMU 9 updates the address conversion table 5 of the NAND Flash™ main memory 4 to match with the address relation data stored in the main memory MMU 9. In addition, the main memory MMU 9 updates the rewrite frequency data 6 of the NAND Flash™ main memory 4 to match with the address history data stored in the access history storage 10. For example, update of rewrite frequency data 6 of the NAND Flash™ main memory 4 is executed when the power of the MPU 1 is turned off or when the access history storage 10 of the MPU 1 is rewritten.

According to this embodiment, the integrated memory management device 2 selects a physical location of the rewritten block based on rewrite frequency. Moreover, the integrated memory management device 2 executes the following controls in place of the foregoing control (operation). One is control of avoiding a defective block, and another is control of accessing all blocks of the NAND Flash™ main memory 4 equally. Another is control of dispersing a location of the access destination block. In this case, the access history storage 10 is stored with data such as a generating location of a defective block stored in the NAND Flash™ main memory 4 or rewrite location distribution thereof. The integrated memory management device 2 may freely combine various controls to select a location of the rewritten block.

According to this embodiment, the integrated memory management device 2 may execute garbage collection or erase control in the NAND Flash™ main memory 4 when interchanging data of cache memory 3.

According to this embodiment, data of at least one of the address relation storage 23 and the access history storage 10 of the main memory MMU 9 may be stored in the secondary cache memory 22. In other words, the address relation data stored in the address relation storage 23 may be stored in the secondary cache memory 22. In addition, access history data including rewrite frequency stored in the access history storage 10 may be stored in the secondary cache memory 22.

The integrated memory management device 2 of the MPU 1 according to this embodiment employs the following algorithm. According to the algorithm, the write target, that is, a physical location of the NAND Flash™ main memory 4 is selected using data stored in the access history storage 10, and then, written back. The integrated memory management device 2 can utilize a program for executing the foregoing algorithm. For example, it is possible to employ excellent algorithm of avoiding rewriting a block having many rewrite frequencies.

The foregoing integrated memory management device 2 according this embodiment employs the following configuration in the MPU 1. Specifically, the foregoing MMU 7, first and second cache controllers 8a, 8b, cache memories 3, 22, main memory MMU 9 and access history storage 10 are integrated. In other words, according to this embodiment, the following architecture is realized. Namely, memory mapping management of the NAND Flash™ main memory 4 is executed by the integrated memory management device 2 of the MPU 1.

In this way, a hierarchy having large overhead is deleted in the memory hierarchy.

In this embodiment, the MPU 1 executes an operation of a memory controller included in a general NAND Flash™ memory. As described above, the operation of the MPU and the operation of the memory controller are combined, and then, executed by the MPU 1, and thereby, memory control are cooperated.

According to this embodiment, it is possible to simplify multi-layer memory hierarchy, and to reduce various costs such as time required for access, time required for manufacture, and cost required for manufacture.

According to this embodiment, the memory hierarchy is simple; therefore, a programmer easily grasps a hierarchy where MMU conversion and a generation of replacement of the cache memory are made. Thus, this serves to easily carry out program optimization.

According to this embodiment, it is possible to easily realize optimization between a cache operation of the MPU 1 and an access operation of the main memory.

(Second Embodiment)

The second embodiment relates to a modification example of the foregoing first embodiment.

Figure 6:
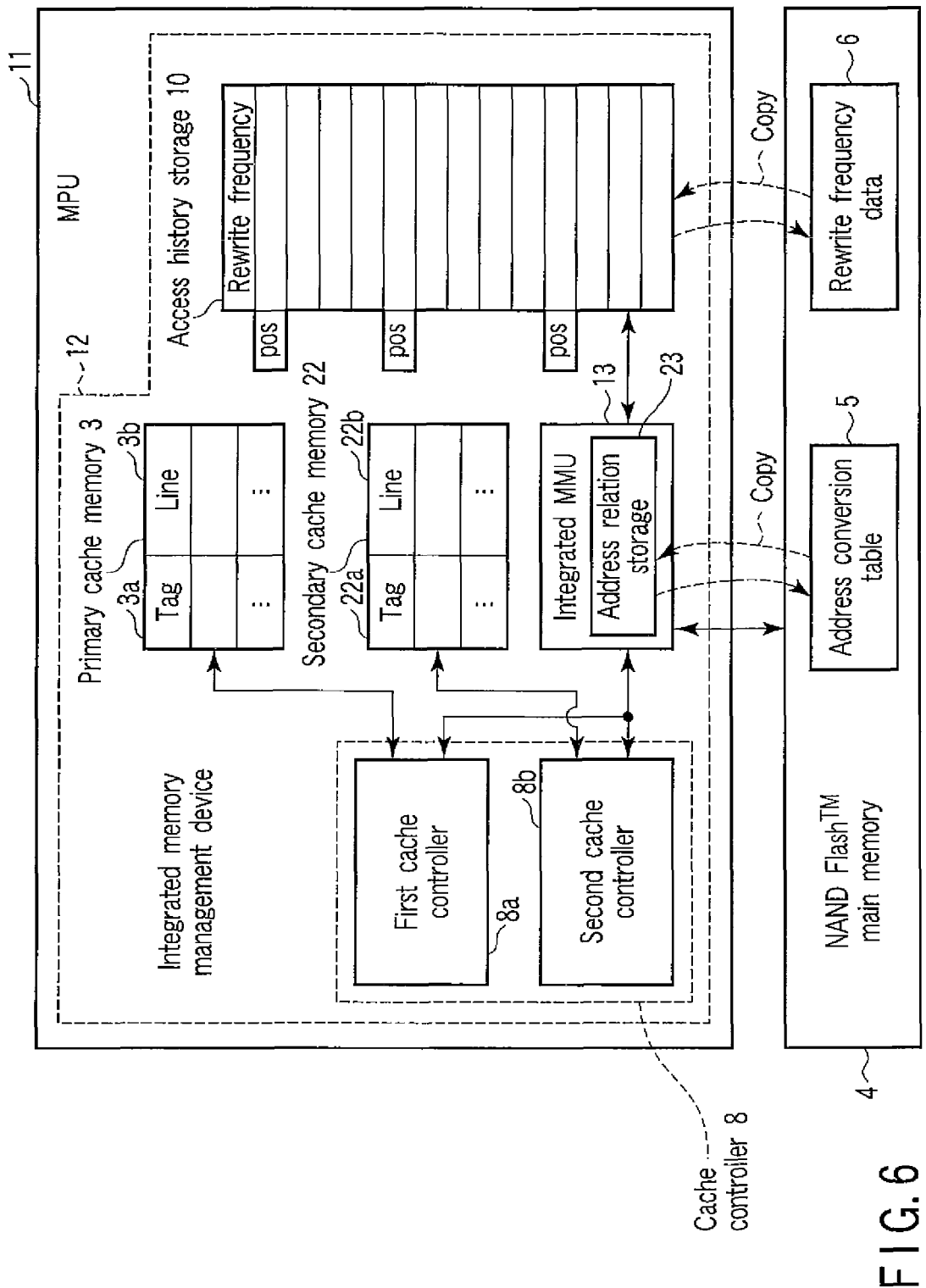
FIG. 6 is a block diagram showing an example of an integrated memory management device in accordance with the second embodiment of the present invention.

FIG. 6 is a bloc diagram showing an example of an integrated memory management device according to the second embodiment.

A MPU 11 includes an integrated memory management device 12 according to the second embodiment. An integrated MMU 13 realizes a function of integrating the MMU 7 and the main memory MMU 9 of the first embodiment.

According to the second embodiment, each tag of the primary and secondary cache memories 3 and 22 is used for managing these cache memories 3 and 22 using a process ID and a logical address.

According to this embodiment, the integrated MMU 13 of a processor, that is, MPU 11 executes a memory mapping management of primary and secondary cache memories 3, 22 and the NAND Flash™ main memory 4. In this way, various memories are integrally managed.

Figure 7:
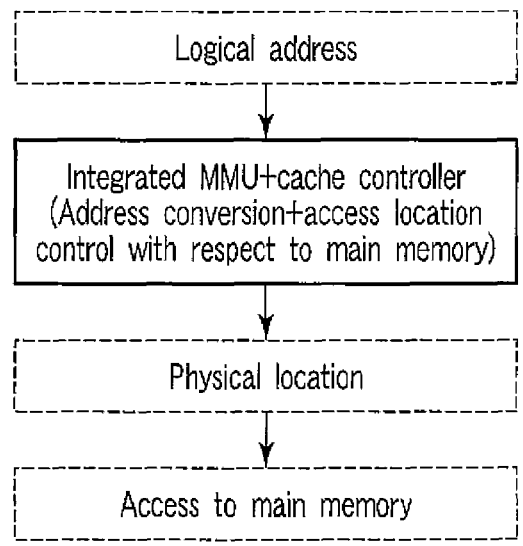
FIG. 7 is a view showing an example of a memory hierarchy of the integrated memory management device in accordance with the second embodiment.

FIG. 7 is a view showing an example of a memory hierarchy of the integrated memory management device 12 according to the second embodiment.

The memory hierarchy belongs to the same hierarchy as the integrated MMU 13 and the cache controller 8.

In the memory hierarchy, when a logical address is converted into a physical location of the NAND Flash™ main memory 4, control of accessing a block having write frequency less than a predetermined number is carried out.

The integrated memory management device 12 accesses the NAND Flash™ main memory 4 based on the determined physical location.

According to the foregoing embodiment, the MMU 7 and the main memory MMU 9 of the first embodiment are integrated. By doing so, the configuration is simplified, and it is possible to reduce various costs such as time cost required for access and economic cost required for manufacture.

The integrated MMU 13 is used, and thereby, the following address conversions are integrated. One is an address conversion with respect to the primary and secondary cache memories 3 and 22. Another is an address conversion with respect to the NAND Flash™ main memory 4. For example, storage contents related to a certain process is stored in a near location in the NAND Flash™ main memory 4 as much as possible. This serves to enable high-speed access. For example, only block having few rewrite frequency is selected, and then, assigned to one process.

(Third Embodiment)

The third embodiment relates to modification examples of the integrated memory management devices 2 and 12 according to the foregoing first and second embodiments.

Figure 8:
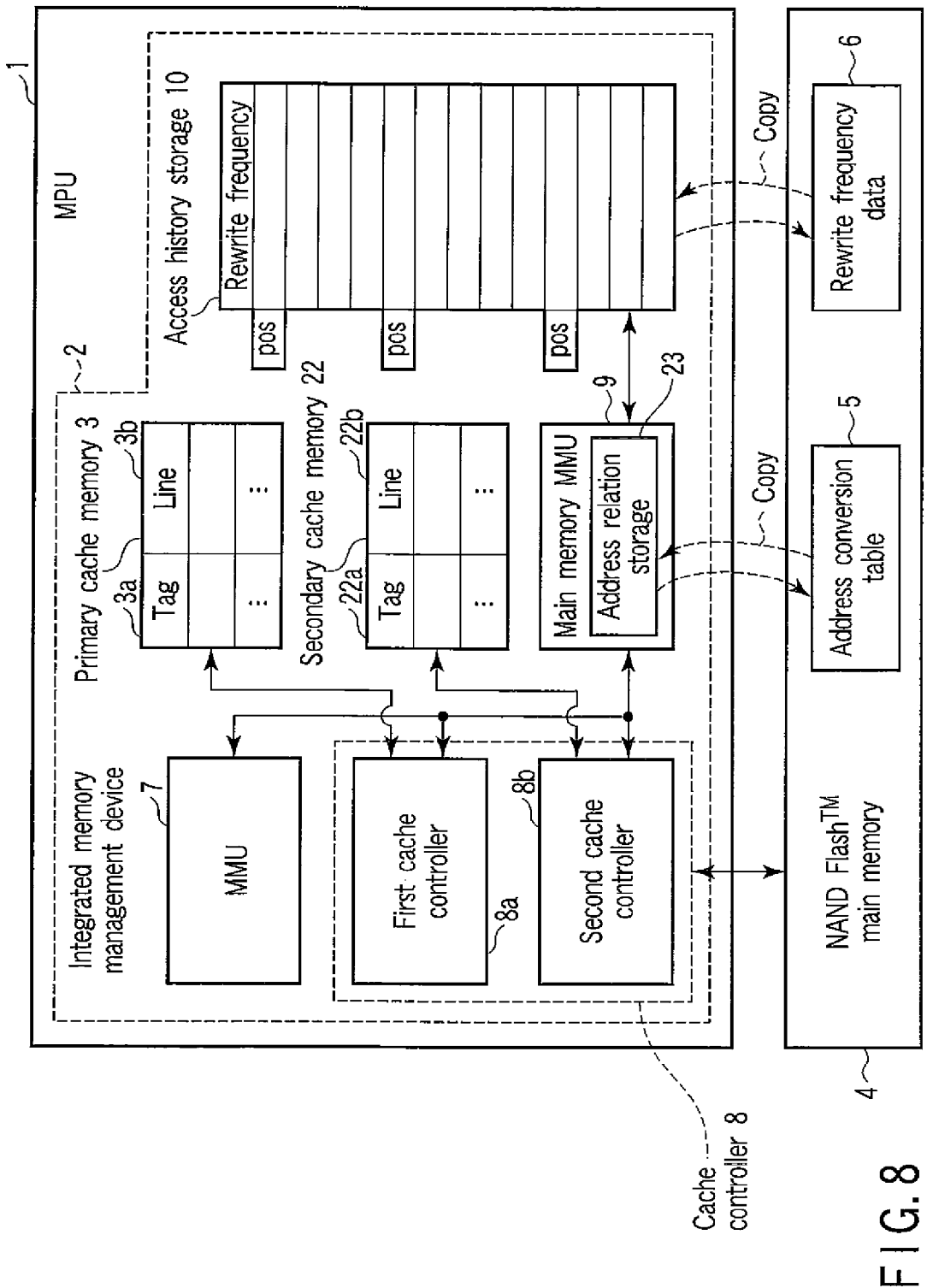
FIG. 8 is a block diagram showing a first example of an integrated memory management device in accordance with the third embodiment of the present invention.

FIG. 8 is a block diagram showing an example of an integrated memory management device 2 according to a modification example of the first embodiment.

In the foregoing first embodiment, the main memory MMU 9 accesses the NAND Flash™ main memory 4 based on the physical address. However, the cache controller 8 may execute access to the NAND Flash™ main memory 4 based on the physical address.

In this case, the main memory MMU 9 executes control of converting a logical address to a physical location. Then, the cache controller 8 accesses the NAND Flash™ main memory 4 based on the physical location selected by the main memory MMU 9. According to this embodiment, the cache controller 8 reads and updates the address conversion table 5 and the rewrite frequency data 6 of the NAND Flash™ main memory 4 in place of the main memory MMU 9.

FIG. 9 is a block diagram showing an example of an integrated memory management device 12 according to a modification example of the first embodiment.

In the foregoing second embodiment, the integrated MMU 13 executes access to the NAND Flash™ main memory 4 based on the physical location. However, the cache controller 8 may execute access to the NAND Flash™ main memory 4 based on the physical address.

In this case, the integrated MMU 13 executes control of converting a logical address to a physical location. Then, the cache controller 8 accesses the NAND Flash™ main memory 4 based on the physical location selected by the integrated MMU 13. According to this embodiment, the cache controller 8 reads and updates the address conversion table 5 and the rewrite frequency data 6 of the NAND Flash™ main memory 4.

(Fourth Embodiment)

The fourth embodiment relates to an example to which the integrated memory management devices 2 and 12 according to the foregoing first to third embodiments are applied.

Figure 10:
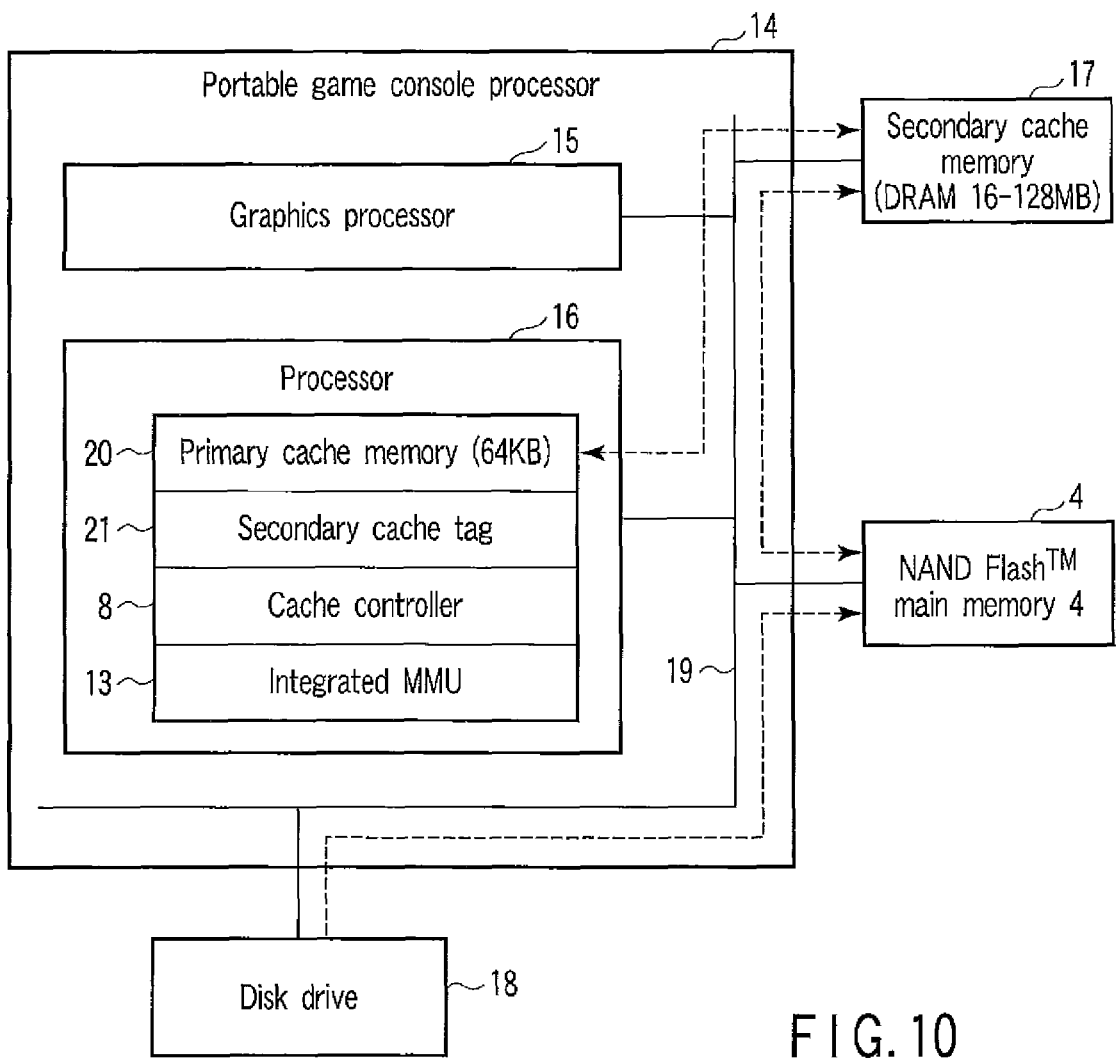
FIG. 10 is a block diagram showing a example to which an integrated memory management device in accordance with a fourth embodiment of the present invention is applied.

FIG. 10 is a block diagram showing an applied example of an integrated memory management device according to the fourth embodiment.

For example, in a game machine or car navigation system, data or program read from a disk drive is once written to a main memory. Thereafter, the data or program written to the main memory is read many times. The fourth embodiment makes an explanation about the case where an integrated memory management device 20 is applied to a game machine. In this case, the integrated memory management device 20 is applied to other devices such as car navigation system in the same manner. In addition, the integrated memory management devices 2, 12 of the foregoing first embodiment may be used in place of the integrated memory management device 20.

A portable game console processor 14 includes a graphics processor 15 and a processor 16.

The graphics processor 15, the processor 16, a secondary cache memory 17, a NAND Flash™ main memory 4 and a disk drive 18 are connected to a bus 19.

The processor 16 includes a primary cache memory 3, a secondary cache tag 21 for accessing the secondary cache memory 17, a cache controller 8 and an integrated MMU 13.

The processor 16 further includes a rewrite frequency storage 10; however, the rewrite frequency storage 10 is not illustrated in FIG. 10. Incidentally, the processor 16 may use the primary or secondary cache memory 3 or 17 as the rewrite frequency storage 10.

The cache controller 8 controls access to the primary and secondary cache memories 3 and 17. For example, a DRAM is usable as the secondary cache memory 17. According to this embodiment, the secondary cache memory 17 is separated from the portable game console processor 14.

A band width to the secondary cache memory 17 is set to about ten times as much as the NAND Flash™ main memory 4. For example, an optical disk drive is usable as the disk drive 18.

In this embodiment, write to the NAND Flash™ main memory 4 is executed when a game cartridge is replaced. In other operations, the NAND Flash™ main memory 4 is used in read only. Frequently written data or program code and frequently read data or program code are stored in the secondary cache memory 17. In addition, the frequently read data or program code is stored in the primary cache memory 3.

For example, of data or program code stored in the primary or secondary cache memory 3 or 17, data or program code having low frequency is written to the NAND Flash™ main memory 4. Of data or program code stored in the NAND Flash™ main memory 4, data or program code having high frequency may be stored in the primary or secondary cache memory 3 or 17.

According to this embodiment, for example, the primary cache memory 3 has a data capacity of about 64 kilobytes, the secondary cache memory 17 has a data capacity of about 16 to 128 megabytes, and the NAND Flash™ main memory 4 has a data capacity of about 1 gigabytes.

For example, the graphics processor 15 has processing capabilities balanced with a speed of the NAND Flash™ main memory 4 having 1/10 band width or about two or three times as much as the speed. Low frequency data is read from the NAND Flash™ main memory 4; conversely, high frequency data is read from the primary or secondary cache memory 3 or 17.

According to this embodiment, garbage collection and erase of the NAND Flash™ main memory 4 are carried out when cache is replaced (cache miss). In this way, it is possible to provide a processor 16, which can realize optimization described above. Thus, preferable optimization is effected.

An entry size of the secondary cache memory 17 is set to about 1 megabyte, and thereby, the secondary cache memory 17 has good compatibility with the NAND Flash™ main memory 4.

According to this embodiment, it is possible to prevent overhead from becoming large because virtual memory conversion is made double.

In this embodiment, the processor 16 is provided with the integrated MMU 13, and thereby, the primary cache memory 3, the secondary cache memory 17 and the NAND Flash™ main memory 4 are integrally managed.

According to this embodiment, it is possible to reduce data stored in resume time.

According to this embodiment, data or program is stored in the NAND Flash™ main memory 4, and thereby, access to the disk drive 18 is reduced. Thus, this serves to reduce wait time, and to improve user's operability and satisfaction.

According to this embodiment, the NAND Flash™ main memory 4 having a memory unit price cheaper than the secondary cache memory 17 (DRAM) is used, and thereby, a large number of data or program is accessible at high speed.

(Fifth Embodiment)

The fifth embodiment relates to a memory device including a MMU, which is interposed between a plurality of processors and a main memory.

FIG. 11 is a block diagram showing the configuration of a memory device according to a fifth embodiment.

The memory device of this embodiment includes a MMU 24. The MMU 24 is connected with a plurality of processors (including Codec IP, Graphic IP) 251 to 254 via a system bus 30. The MMU 24 is applied to the multiprocessor configuration. The MMU 24 is further connected with a non-volatile main memory 26 such as a NAND Flash™ memory, for example. According to the fifth embodiment, the number of processors is one or more, and may be freely changeable.

In the main memory, writing and reading are carried out at a unit of plural bits called as a page. Erasing is collectively carried out at a unit collecting a plurality of pages called as a block.

Some of the foregoing processors 251 to 254 execute a process including a logical address. According to this embodiment, processors 251, 252 and 254 execute processes 271, 272 and 274, respectively. Incidentally, the foregoing processes 271, 272 and 274 may be an operating system.

The processors 251 to 254 include primary cache memories 281 to 284 and secondary cache memories 291 to 294, respectively.

The MMU 24 executes wear leveling, and makes a conversion from a logical address to a physical address.

The MMU 24 executes wear leveling at a page unit or block unit of the main memory 26. A wear leveling counter is stored in a redundancy area 26a of the main memory. The redundancy area 26a is a redundancy area given every page or block of the main memory 26. When making mapping in a memory space, the MMU 24 secures memory considering wear leveling.

The MMU 24 handles a removable memory as a main memory, and maps it in a memory space.

The MMU 24 is provided on the side of the main memory 26 rather than the side of the processors 271 to 274. However, the MMU 24 may be provided on the side of the processors 271 to 274.

The MMU 24 changes a page size based on an instruction and data. For example, an instruction page size is set to a small size such as 16 kilobytes, and a data page size is set to a large size such as 512 kilobytes.

The main memory 26 has the same memory page size as the page size (process) of the MMU 24 or a memory page size of multiple of the page size of the MMU.

Page transfer is collectively executed between primary and secondary cache memories 281 to 284 and 291 to 294 and the main memory 26. The batch transfer is carried out at the block unit of the main memory (e.g., 256 kilobytes to 512 kilobytes).

Access to primary and secondary cache memories 281 to 284 and 291 to 294 is made based on a logical address. The logical address is used on the system bus 30.

The integrated MMU 24 integrally executes the following conversions. One is a conversion from a process level logical address to a physical address with respect to the processors 271 to 274. Another is a conversion from a logical block to a physical block for the wear leveling of the page or block unit of the main memory 26.

According to the fifth embodiment, a system logical address 31 having a format shown in FIG. 12 is used. The system logical address 31 is composed of a processor ID and a process ID and a process internal logical address.

The main memory 26 is stored with a page table 26b in the entire system. Specifically, the main memory 26 has a page table 26b integrating processes 271, 272 and 274, and does not have a page table every process 271, 272 and 274.

According to this embodiment, a main memory having the same capacity as HDD is used as the main memory 26. In this case, there is no need of using a secondary storage (swap out) because of using a memory space larger than a physical memory. In the conventional case, for example, the physical memory is a DRAM, and has a capacity of about 1 GB. However, if a 4-GB logical memory space is used every process, a secondary storage area is secured on the HDD having a larger storage capacity, and then, swap in/swap out must be executed. On the contrary, according to this embodiment, the main memory has the same level storage as the HDD capacity; therefore, the secondary storage does not need to be used.

Thus, this serves to simplify the device configuration and operation.

According to this embodiment, instant on/off is carried out; therefore, resume is effected at a high speed.

In the conventional case, a file must be loaded before execution. On the contrary, according to this embodiment, there is only need to jump into an execution address on the cache memories 281 to 284 or 291 to 294 or the main memory 26. Thus, there is no need of lading the file before execution.

(Sixth Embodiment)

The sixth embodiment relates to a modification example of the foregoing fifth embodiment.

FIG. 13 is a block diagram showing the configuration of a memory device according to a sixth embodiment.

In the memory device of this embodiment, a plurality o MMUs 241 and 242 is connected with a plurality of processors (including Codec IP, graphic IP) 251 to 254 via a network. The MMUs 241 and 242 are connected with a plurality of non-volatile main memories 261 and 262 such as NAND Flash™ memory, for example.

The number of the MMUs and the number of the main memories may be freely changeable.

The main memory 261 has the same features as the main memory 26 of the foregoing fifth embodiment. The main memory 261 has a redundancy area 261a, which stores a wear leveling counter, and a page table 261b, which integrates these processes 271, 272 and 274. The main memory 262 has the same features as the main memory 261.

According to the sixth embodiment, a logical address 34 is used. The logical address shown in FIG. 14 is composed of IP address or IPv6 address of the network 33, processor ID and process ID, and process internal logical address.

The main memories 261 and 262 have the same memory page size as that of the MMUs 241 and 242 or has a memory page size of integer multiples of the page size of the MMUs 241 and 242.

Page transfer is collectively executed between primary cache memories 281 to 284 and secondary cache memories 291 to 294 and main memories 261 and 262. The batch transfer is executed at a block unit (e.g., 256 kilobytes to 512 kilobytes) of the main memory.

According to this embodiment, access to the primary cache memories 281 to 284 and to secondary cache memories 291 to 294 is made based on a logical address. A logical address is used on the network 33.

Integrated MMUs 241 and 242 integrally make the following conversions. One is a conversion from a process level logical address to a physical address with respect to the processors 271 to 274. Another is a conversion from a logical block to a physical block for wear leveling of the page or block unit of the main memories 261 and 262.

According to the fifth embodiment, the same effect as the foregoing fifth embodiment is obtained in a wide memory space via the network 33.

(Seventh Embodiment)

The seventh embodiment relates to a modification example of the foregoing fifth and sixth embodiments. In the following description, a modification example of the fifth embodiment will be hereinafter described. The sixth embodiment may be also modified in the same manner.

Figure 15:
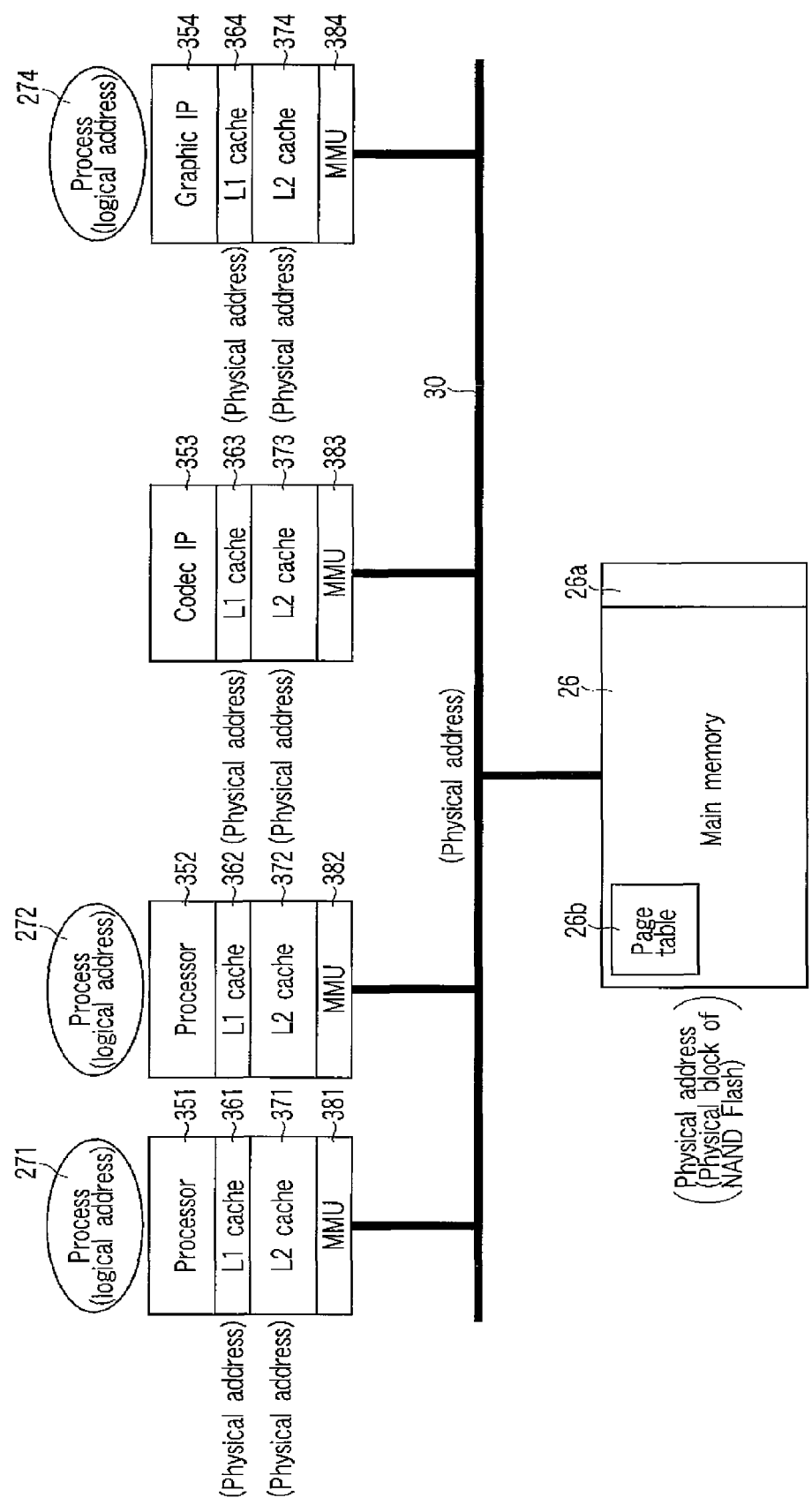
FIG. 15 is a block diagram showing the configuration of a memory device according to a seventh embodiment of the present invention.

FIG. 15 is a block diagram showing the configuration of a memory device according to a seventh embodiment.

A plurality of processors 351 to 354 is connected with a main memory 26 via a system bus 30. According to this embodiment, the number of processors may be freely changeable.

Some of the foregoing processors 351 to 354 execute a process including a logical address. According to this embodiment, processors 351, 352 and 354 execute processes 271, 272 and 274, respectively. Incidentally, the foregoing processes 271, 272 and 274 may be an operating system.

The foregoing processors 351 to 354 include primary cache memories 361 to 364, secondary cache memories 371 to 374 and MMUs 381 to 384, respectively.

The MMUs 381 to 384 each execute wear leveling, and make a conversion from a logical address to a physical address. These MMUs 381 to 384 are provided on the side of the processors 351 to 354.

The main memory 26 has the same memory page size as that of the MMUs 381 to 384 or has a memory page size of integer multiples of the page size of the MMUs 381 to 384.

Page transfer is collectively executed between primary cache memories 361 to 364 and secondary cache memories 371 to 374 and the main memory 26. The batch transfer is executed at a block (page) unit (e.g., 256 kilobytes to 512 kilobytes) of the main memory.

According to the seventh embodiment, a physical address is used for making access to primary cache memories 361 to 364 and for making access to secondary cache memories 371 to 374. A physical address is also used on the system bus 30.

The MMUs 381 to 384 provided for the processors 351 to 354 each make the following conversions. One is a conversion from a process level logical address to a physical address. Another I a conversion from a logical address to a physical address for wear leveling of a page or block unit of the main memory 26.

As described above, according to the seventh embodiment, even if the MMUs 381 to 384 are provided on the side of the processors 351 to 354, the same effect as the foregoing fifth embodiment is obtained.

What is claimed is:

1. A memory management device comprising:
   a first memory management unit converting a logical address for accessing a cache memory into a physical address for accessing the cache memory, and included in a processor;
   a cache controller accessing the cache memory based on the physical address for accessing the cache memory, and included in the processor;
   an access history storage storing access history data indicating an access state to a main memory outside the processor, and included in the processor, wherein the access history includes a rewrite frequency for each location in the main memory;

an address relation storage storing address relation data indicating a relationship between a logical address and a physical address in the main memory, and included in the processor; and a second memory management unit converting a logical address for accessing the main memory into a physical address for accessing the main memory based on the access history data and the address relation data, and accessing the main memory based on the physical address for accessing the main memory, and further, included in the processor.

2. The device according to claim 1, wherein the main memory is a NAND Flash memory.

3. The device according to claim 1, wherein the access history data further includes at least one of a defective location in the main memory and a location in which data is stored in the main memory.

4. The device according to claim 1, wherein the second memory management unit selects a location having a rewrite frequency less than a predetermined frequency in the main memory based on the access history data, and stores data in the selected location.

5. The device according to claim 1, wherein the second memory management unit reads part or all of main memory data including at least one of a rewrite frequency for each location in the main memory, a defective location in the main memory and a location in which data is stored in the main memory, which are stored in the main memory, and stores part or all of the main memory history data as the access history data in the access history storage.

6. The device according to claim 5, wherein the second memory management unit updates the access history data of the access history storage when data write to the main memory is generated from the second memory management unit, and updates the main memory history data of the main memory based on the access history data stored in the access history storage.

7. The device according to claim 1, wherein the second memory management unit includes the address relation storage.

8. The device according to claim 1, wherein the second memory management unit stores part or all of an address conversion table stored in the main memory and showing a relationship between a logical address and a physical address as the address relation data in the address relation storage.

9. The device according to claim 8, wherein the second memory management unit updates the address relation data when data write to the main memory is generated from the second memory management unit, and updates the address conversion table of the main memory based on the address relation data.

10. The device according to claim 1, wherein when read target data is not stored in the cache memory, the second memory management unit reads the read target data from the main memory to store the read target data in the cache memory via the cache controller, stores address relation data corresponding to the read target data in the address relation storage, and stores access history data corresponding to the read target data in the access history storage.

11. The device according to claim 1, further comprising:
an integrated memory management unit integrating the first and second memory management units.

12. The device according to claim 1, wherein the cache controller controls access to a plurality of cache memories including the cache memory.

13. The device according to claim 12, wherein at least one of said plurality of the cache memories is provided outside the processor.

14. The device according to claim 1, wherein part of the cache memory is used as the access history storage and the access relation storage.

15. A memory management device comprising:
a first memory management unit converting a logical address for accessing a cache memory into a physical address for accessing the cache memory, and included in a processor;

an access history storage storing access history data indicating an access state to a main memory outside the processor, and included in the processor, wherein the access history includes a rewrite frequency for each location in the main memory;

an address relation storage storing address relation data indicating a relationship between a logical address and a physical address in the main memory, and included in the processor;

a second memory management unit converting a logical address for accessing the main memory into a physical address for accessing the main memory based on the access history data and the address relation data, and included in the processor; and a controller accessing the cache memory based on a physical address for accessing the cache memory, and accessing the main memory based on a physical address for accessing the main memory, and included in the processor.

16. The device according to claim 15, wherein the cache controller updates the access history data of the access history storage when data write to the main memory is generated from the cache controller, and updates the main memory history data of the main memory based on the access history data stored in the access history storage.

17. The device according to claim 15, wherein the cache controller updates the address relation data when data write to the main memory is generated from the cache controller, and updates the address conversion table of the main memory based on the address relation data.

18. The device according to claim 15, wherein when read target data is not stored in the cache memory, the cache controller reads the read target data from the main memory to store the read target data in the cache controller, stores address relation data corresponding to the read target data in the address relation storage, and stores access history data corresponding to the read target data in the access history storage.

19. The device according to claim 15, wherein the access history data further includes at least one of a defective location in the main memory and a location in which data is stored in the main memory.

* * * * *